United States Patent [19]

Locker et al.

[11] Patent Number: 5,409,870
[45] Date of Patent: Apr. 25, 1995

[54] MODIFIED CORDIERITE PRECURSORS

[75] Inventors: Robert J. Locker, Corning; Martin J. Murtagh, Trumansburg, both of N.Y.

[73] Assignee: Corning Incorporated, Corning, N.Y.

[21] Appl. No.: 979,807

[22] Filed: Nov. 20, 1992

[51] Int. Cl.$^6$ .............................................. C04B 35/18
[52] U.S. Cl. .................................... 501/119; 501/153; 264/65
[58] Field of Search ..................... 501/118, 119, 153; 264/65

[56] References Cited

U.S. PATENT DOCUMENTS

| | | | |
|---|---|---|---|
| 3,112,184 | 11/1963 | Hollenbach | 55/523 X |
| 3,790,654 | 2/1974 | Bagley | 264/209.1 X |
| 3,885,977 | 5/1975 | Lachman et al. | 501/119 X |
| 3,950,175 | 4/1976 | Lachman et al. | |
| 3,958,058 | 5/1976 | Elmer | 501/9 X |
| 3,979,216 | 9/1976 | Fritsch, Jr. et al. | 501/119 |
| 4,001,028 | 1/1977 | Frost et al. | |
| 4,280,845 | 7/1981 | Matsuhisa et al. | |
| 4,295,892 | 10/1981 | Matsuhisa et al. | 501/119 X |
| 4,329,162 | 5/1982 | Pitcher, Jr. | 55/DIG. 30 |
| 4,415,344 | 11/1983 | Frost et al. | 55/523 |
| 4,421,699 | 12/1983 | Inoguchi et al. | |
| 4,434,117 | 2/1984 | Inoguchi et al. | |
| 4,568,402 | 2/1986 | Ogawa et al. | 501/119 X |
| 4,772,580 | 9/1988 | Hamanaka et al. | |
| 4,869,944 | 9/1989 | Harada et al. | 55/523 X |
| 4,877,670 | 10/1989 | Hamanaka | |
| 4,950,628 | 8/1990 | Landon et al. | 501/119 |
| 4,973,566 | 11/1990 | Readey et al. | 501/119 X |
| 5,114,644 | 5/1992 | Beall et al. | 501/119 X |
| 5,141,686 | 8/1992 | Murtagh | 501/119 X |

FOREIGN PATENT DOCUMENTS

| | | |
|---|---|---|
| 0278749 | 8/1988 | European Pat. Off. |
| 0354721 | 2/1989 | European Pat. Off. |
| 0450899 | 10/1991 | European Pat. Off. |

*Primary Examiner*—Karl Group
*Attorney, Agent, or Firm*—Scott M. Terrillion; K. van der Sterre

[57] ABSTRACT

Cordierite-containing articles are produced by a method comprising the steps of providing raw materials including including alumina-yielding ingredients, magnesia-yielding ingredients, and silica-yielding ingredients, suitable to form an analytical batch composition by weight on an oxide basis of 9–20 weight percent MgO, 30–50 weight percent $Al_2O_3$, and 41–56.5 weight percent $SiO_2$. The raw materials include talc having a BET surface area of no greater than about 4.0 m$^2$/g, and uncalcined clay having an average particle size of no greater than about 2.0 μm. The raw materials are blended with an effective amount of vehicle and forming aids to form a plastic mixture. The plastic mixture is anisostatically formed into a green body and dried. The dried green body is fired at a temperature and for a time effective to form a cordierite/containing ceramic article. The cordierite-containing articles exhibit a coefficient of thermal expansion of not greater than about $4.0 \times 10^{-7}$/°C. and transverse I ratios of not less than about 0.85. The method of the present invention is particularly useful in forming cordierite honeycomb structures used as catalyst supports for automobiles or as particulate filters for the exhaust fluids of diesel engines.

13 Claims, No Drawings

MODIFIED CORDIERITE PRECURSORS

FIELD OF THE INVENTION

The present invention relates to a method of making cordierite-containing articles with an improved transverse I ratio, an improved coefficient of thermal expansion, and improved thermal shock resistance by modifying the raw material batch composition of the article.

BACKGROUND OF THE INVENTION

Automobile exhaust gases are conventionally purified with a catalyst supported on a ceramic body able to withstand high temperatures. The preferred catalyst support structure is a honeycomb configuration which includes a multiplicity of unobstructed parallel channels sized to permit gas flow and bounded by thin ceramic walls. The channels may have any configuration and dimensions provided gases can freely pass through them without being plugged by entrained particulate material. Examples of such preferred structures include the thin-walled ceramic honeycomb structures described in U.S. Pat. No. 3,790,654 to Bagley and in U.S. Pat. No. 3,112,184 to Hollenbach.

Ceramic honeycomb catalyst supports are exposed to high temperatures resulting from contact with hot exhaust gases and from the catalytic oxidation of uncombusted hydrocarbons and carbon monoxide contained in the exhaust gas. In addition, catalyst supports must withstand rapid temperature increases and decreases when the automobile engine is started and stopped. Such operating conditions require the ceramic honeycomb catalyst support to have a high thermal shock resistance, a property generally inversely proportional to the coefficient of thermal expansion.

Generally similar ceramic structures are used as diesel engine particulate filters. In such applications, ceramic honeycomb filters are fitted to diesel engine exhaust systems for removal of particulates from the high temperature diesel engine exhaust gases. Examples of diesel engine particulate filters are disclosed in U.S. Pat. Nos. 4,329,162 to Pitcher, Jr. and 4,415,344 to Frost et al. Again, the ceramic materials utilized in such applications must have a high thermal shock resistance and a low coefficient of thermal expansion.

Cordierite ($2MgO.2Al_2O_3.5SiO_2$) is known to display a very low thermal expansion over a wide range of temperatures. In substantial amounts, cordierite gives a ceramic body excellent thermal shock resistance when subjected to rapid and severe changes in temperatures. This property has caused cordierite to find widespread use as a catalyst support for automotive catalytic converters and as diesel engine particulate filters. Despite the low average coefficient of thermal expansion of cordierite crystals, the need further to reduce this value in ceramic articles remains a desired objective.

U.S. Pat. No. 3,885,977 to Lachman et al. ("Lachman") forms an extruded, honeycomb carrier having thin walls extending between its ends, and comprising a mixture of clay, talc, and alumina which react during firing to from cordierite. Because of the orientation imparted to the clay and talc platelets during extrusion, the cordierite grains that develop during firing have a preferred orientation, with the cordierite crystallographic c-axes tending to lie in the plane of the walls and the a-axes tending to lie perpendicular to the plane of the walls. The thermal expansion of cordierite is known to be low, even negative, in the direction of the crystallographic c-axis and relatively high in the direction of the a-axis. As a result, a low coefficient of thermal expansion in the direction parallel to the walls and a higher coefficient of thermal expansion transverse the walls is achieved. The low coefficient of thermal expansion aspect of the present invention is able to impart thermal shock resistance to the body as a whole. By contrast, the effect of the transversely-extending high coefficient of thermal expansion regions is minimal, because any expansion in such directions is accommodated by internal spaces in the honeycomb.

Others have attempted to produce cordierite bodies with an improved coefficient of thermal expansion. For example, in U.S. Pat. No. 3,958,058 to Elmer, cordierite with an ultra-low thermal expansion coefficient and a high thermal shock resistance is obtained by treating it with a strong mineral acid. The acid is said to remove $Al_2O_3$ and MgO, while the low expansion values are attributable to microcracks in the leached material. It has been elsewhere recognized that the internal stresses in highly anisotropic crystalline cordierite ceramics leads to such microcracking. Despite its ability to reduce a cordierite article's coefficient of thermal expansion, this acid treatment has not received wide acceptance, because it requires specialized handling systems for the acid and chemically modifies the cordierite product by removal of $Al_2O_3$ and MgO.

U.S. Pat. No. 3,979,216 to Fritsch, Jr. et al. relates to the production of synthetic cordierite ceramics having thermal expansions below 1100 ppm in the temperature range of 25°–800° C. and 15 to 150 micrometer microcracks. This product is prepared by mixing talc, clay, and alumina, consolidating this mixture as a green body, heating at 150° C. per hour to a temperature of 1350° to 1425° C., holding at this elevated temperature for 0.5 to 10 hours, and cooling to below 1000° C. at a rate of −150° C. per hour. Thermal expansion is said to be dependent upon maintaining a low glass content in the body.

U.S. Pat. No. 4,869,944 to Harada et al. relates to a cordierite honeycomb structural body formed by including high purity, non-crystalline silica in a mixture of talc, kaolin, and alumina. As a result, crystals with their c-axes preferentially oriented in the plane of the walls are formed. Structural microcracking occurs to the same degree regardless of whether or not high purity, non-crystalline silica is incorporated in the mixture; however, the use of silica causes more microcracks to form along the crystallographic c-axis direction of the crystals in the domain structure. With such microcrack orientation, the article is able to absorb positive thermal expansion better and give the body a low coefficient of thermal expansion.

Although there have been many efforts to reduce the coefficient of thermal expansion of cordierite-containing articles in a variety of ways, there has been little work done to optimize the precursors used to form a cordierite-containing article. There is a need for improved raw material batch compositions that will improve the coefficient of thermal expansion of the cordierite body while maintaining the other favorable properties cordierite typically exhibits.

SUMMARY OF THE INVENTION

It has been unexpectedly found that, in accordance with the present invention, raw materials including talc having a BET surface area of no greater than about 4.0 m²/g, and uncalcined clay having an average particle size of no greater than about 2.0 μm will form a cordierite body with excellent crystalline orientation and a coefficient of thermal expansion less than about $4.0 \times 10^{-7}$ m²/g.

The method of the present invention comprises the steps of providing raw materials, including alumina-yielding ingredients, magnesia-yielding ingredients, and silica-yielding ingredients, suitable to form an analytical batch composition by weight on an oxide basis of 9-20 weight percent MgO, 30-50 weight percent $Al_2O_3$, and 41-56.5 weight percent $SiO_2$. The raw materials include talc having a BET surface area of no greater than about 4.0 m²/g, and clay having an average particle size of no greater than about 2.0 μm. The raw materials are blended with an effective amount of vehicle and forming aids to form a plastic mixture. The plastic mixture is anisostatically formed into a green body and dried. The dried green body is fired at a temperature and for a time effective to form a cordierite/containing ceramic article.

The method of the present invention provides a cordierite body characterized by excellent cordierite crystal orientation as shown by transverse I ratios of at least about 0.85 and a coefficient of thermal expansion no greater than about $4 \times 10^{-7}$/°C. from about 25° to 800° C. Cordierite bodies produced according to the present method have the additional advantage of exhibiting coefficients of thermal contraction not greater than about $7.0 \times 10^{-7}$/°C. measured from about 600°-400° C. Furthermore, the low coefficients of thermal expansion and contraction can be obtained without the use of expensive fine alumina or silica which can adversely affect the physical qualities of the cordierite-containing article.

DETAILED DESCRIPTION OF THE INVENTION

The present invention relates to cordierite-containing articles and to a method of fabricating these articles using an optimized combination of raw materials. The cordierite-containing articles formed by the method of the present invention exhibit improved crystal orientation and a low coefficient of thermal expansion. The raw materials of the present invention are provided to produce a cordierite-containing ceramic article 41-56.5 wt % $SiO_2$, 30-50 wt % $Al_2O_3$, and 9-20 wt % MgO. The total weight of MgO, $Al_2O_3$, and $SiO_2$ is preferably at least about 95% of the entire weight of the cordierite-containing article. One preferred cordierite analytical batch composition contains 12.5-15.5 wt % MgO, 34.2-39.5 wt %, $Al_2O_3$, and 48.0-51.6 wt % $SiO_2$.

In accordance with the present invention, the alumina-yielding ingredients, magnesia-yielding ingredients, and silica-yielding ingredients comprise talc having a BET surface area of no greater than about 4.0 m²/g, and clay having an average particle size of no greater than about 2.0 μm.

The precise selection of raw materials and the precise amounts which comprise the batch within the ranges outlined above will depend on the fired composition sought, and the desired properties (e.g., improved coefficient of thermal expansion, improved dimensional accuracy, reduced tendency toward cracking, overall porosity, pore size).

The talc used in the method of the present invention is in the form of a platy talc having a BET (Brumauer, Emmett, Teller) surface area of no greater than about 4.0 m²/g, preferably no greater than about 2.0 m²/g. The specific, or "BET", surface area is a measure of the surface area per unit mass of material. It is commonly measured by depositing a layer of gas on the material and measuring the physical adsorption of the gas at cryogenic temperatures. Further details regarding BET surface area are disclosed in S. Brumauer et al., 60 Journal of the American Chemical Society 309 (1938), which is hereby incorporated by reference.

For the purposes of this invention, a platy material has a platelet particle morphology, that is, the particles have two long dimensions and one short dimension, or, the length and width of the platelet are much larger than its thickness. It is preferred that the talc have a morphology index of no less than about 0.80. The morphology index is a measure of the degree of platiness of the talc and is described in U.S. Pat. No. 5,141,686 to Murtaugh, the disclosure of which is hereby incorporated by reference. One typical procedure for measuring the morphology index is to place the talc sample in a holder so that the orientation of the platy talc is maximized within the plane of the sample holder. The x-ray diffraction pattern is then determined for this oriented talc. The morphology index M semi-quantitatively relays the platy character of the talc relative to its XRD peak intensities using the following equation:

$$M = I_x(I_x + 2I_y)^{-1}$$

Where $I_x$ is the intensity of the (004) peak and $I_y$ is the intensity of the (020) reflection (overlapped with the (111) and (110)). It is also preferred that the weight percent of talc having a mean particle size less than 2 μm divided by the talc morphology index be a value no greater than about 30, most preferably about 20.

CaO, normally present in talc as an impurity, is preferably present in the talc in a concentration no greater than about 0.3 wt %, most preferably no greater than about 0.19 wt %. The level of talc in the raw material batch composition of the present invention is generally about 39 to 42 wt %.

Clay used as a raw material in the method of the present invention can be calcined or uncalcined. The clay should be platy (i.e., having particles with dimensions as described above for talc), or stacked clay which can be delaminated into platelets during processing, or mixtures thereof. The clay used in the present method should have an average particle size no greater than about 2.0 μm. Preferably, the clay has a BET surface area no less than 7, most preferably no less than 10, m²/g. The concentration of clay used is generally from about 10.0 to 20, preferably from about 12 to 16, weight percent of the raw materials.

If calcined clay is present in the raw material batch composition, it preferably has a BET surface area no less than about 7, most preferably no less than about 10, m²/g before calcining. When used, calcined clay is generally present in a concentration from about 20 to 35, preferably 28 to 32, weight percent of the raw materials. Preferably, the concentration of calcined clay in the raw material composition is as small as possible to maintain a low coefficient of thermal expansion in the fired cordierite body. The reduced amount of calcined clay can be compensated for by increasing the levels of uncalcined clay, the alumina-yielding ingredient(s) and/or silica.

The alumina-yielding ingredients can be in the form of aluminum oxide per se, or any material that forms aluminum oxide upon firing, such as aluminum hydroxide, or mixtures thereof. As discussed above and in the Examples infra, the present method allows the production of cordierite-containing articles exhibiting low coefficients of thermal expansion without the addition of expensive fine alumina (i.e., alumina having a particle size no greater than about 2.0 μm). However, should it be desired to reduce the coefficient of thermal expansion even more, fine alumina can be used. Generally, the alumina-yielding ingredient can have a mean particle size anywhere in the range from about 0.6 to 15 μm. Aluminum oxide, when used as the alumina-yielding ingredient, is generally present in a concentration in the range from about 10 to 18, preferably 12 to 15, wt % of the raw materials and is preferably in the form of alpha-alumina.

Also as stated above, the present method allows the production of cordierite-containing articles exhibiting low coefficients of thermal expansion (i.e., less than about $4.0 \times 10^{-7}/°C$. measured between about 25° and 800° C.) without the use of silica. However, silica can be used if it is desired to further reduce the coefficient of thermal expansion of the cordierite containing article. Silica can be used in any form, e.g., crystalline or non-crystalline. The silica can be present in a range from about 1 to 20, preferably 10 to 15, weight percent of the raw materials. If silica is not used, the silica in the fired body can be derived from appropriate amounts of silica-yielding ingredients such as clay and talc.

Specific preferred raw material compositions are disclosed in the Examples below.

The process of the present invention is particularly suitable for making structures having an extruded honeycomb configuration with a matrix of thin walls forming a multiplicity of open-ended cells. The cells extend from one end of the honeycomb to the other, and the thin walls have a substantially smaller coefficient of thermal expansion in the direction parallel to the axes of the open-ended cells than transverse to the thin walls. Such articles and their production are fully disclosed in U.S. Pat. No. 3,885,977 to Lachman et al., the disclosure of which is hereby incorporated by reference.

The crystals of cordierite, treated in accordance with the present invention, become preferentially oriented during the firing process. This is accomplished by the use of raw materials in the form of flat, planar particles (i.e., platelets) rather than large isodimensional particles.

The mixture of raw materials is blended with water and extrusion aids to achieve sufficient plastic flow to orient the platelets properly. Extrusion aids, such as methylcellulose and sodium stearate, are added to give the mixture formability and green strength prior to firing. Water, which also aids plastic formability should be used at level of 15 to 36% based on the weight of the dry material.

Once a blend of raw materials in a plastically formable state is prepared, it can be subjected to a plastic flow or extrusion step which orients clay and talc platelets in the green ware. In forming structures with thin web and thin ribbon material, the desired orientation of clay and talc platelets is in the plane of the webs. Other forming methods such as rolling and pressing of sheets, which may be assembled into honeycomb structures, can similarly be produced with a favorable orientation.

In conventional isostatic forming methods, clay and talc particles of the batch tend to be left in the same orientation imparted during mixing and preforming preparation. By contrast, the present anisostatic method does not apply equal forces to all parts of the body being formed, and, therefore, the clay and talc platelets are caused to slip and rotate in the plastic batch while trying to reach a planar orientation. In pressing or extruding a ribbon of material, for example, the orientation results in an ideal configuration of the c-axis of the clay. The resulting cordierite crystals are oriented, after firing, to have the low expansion c-axes lying preferentially in the plane of the ribbon and the high expansion a-axes oriented transverse to that plane and parallel to the thin dimension.

When forming an open celled, thin walled honeycomb structure, in accordance with the present invention, cordierite is oriented to have a low expansion along the axes of the cells and a high expansion across the thin wall (but not across the entire body normal to the cell axes). The effect of the high expansion direction is minimal, because the internal spaces in honeycomb allow expansion of the thin walls into the cells. A typical honeycomb structure useful with the present invention has a wall thickness of between about 0.076 millimeters to 1.27 millimeters with cell densities of about 1.4 to about 144 cells/square centimeter. The thickness of the thin walls is not critical for achieving proper orientation, but thinner walls enable more complete and more consistent planar orientation.

The formed green body is then dried. The body may be dried by any conventional method such as hot-air drying or dielectric drying. Dielectric drying is preferred.

Besides honeycomb structures, other shapes can be extruded or otherwise formed, and the anisotropy of the expansion will be controlled by the orientation imparted to the clay platelets during forming.

The firing range for the formed cordierite body should be 1340°–1440° C. with a soak time sufficient to yield a substantially complete reaction to the cordierite phase. Soak times of 6 to 12 hours may be used. The resulting fired body is, preferably, at least about 95% by weight cordierite.

The cordierite body produced in accordance with the present invention is characterized by a low coefficient of thermal expansion. For example, the coefficient of thermal expansion is less than about $4.0 \times 10^{-7}/°C$. from about 25° C. to 800° C. In certain preferred embodiments set forth in the Examples below, the coefficient of thermal expansion is less than about $3.0 \times 10^{-7}/°C$. from about 25° C. to 800° C.

The overall porosity of the formed cordierite body can vary as desired, but preferably is less than about 40%.

The body when formed as a honeycomb structure for example, by extrusion, is further characterized by the transverse I ratio. The transverse I ratio is represented by the formula:

$$\text{Transverse } I \text{ ratio} = \frac{I_{(110)}}{I_{(110)} + I_{(002)}}$$

where $I_{(110)}$ and $I_{(002)}$ are peak heights of the reflections from the (110) and (002) planes respectively as described in U.S. Pat. No. 3,885,977 to Lachmann, et al. "Transverse" refers to the orientation of a honeycomb sample in the x-ray beam. The x-ray beam impinges a planar surface at an angle. Measurements of the transverse I ratio are made when the planar surface of the sample is the flat surface of a formed wall of the honeycomb. For a completely randomly oriented cordierite, the I ratio will be about 0.65. If the transverse I ratio with respect to the extrusion direction of the body exceeds 0.69 then the cordierite crystallites are becoming substantially oriented with respect to the plane of the webs. A high transverse I ratio will yield a low thermal expansion as measured in the extrusion (i.e., axial) direction. It should be noted that in some cases the thermal expansion can be lower than expected from I ratio alone and this can be due to the influence of microcracking as is well known in the state of the art for anisotropic polycrystalline bodies. The bodies of the present invention typically have a transverse I ratio of greater than about 0.85. Preferred embodiments of the present invention, set forth in the Examples below, exhibit a transverse I ratio greater than about 0.88.

The present invention is further illustrated by the following non-limiting example.

EXAMPLES

Samples 1–10 were all prepared in the following manner. Each of the samples contained one of six talcs, denominated below as Talcs A, B, C, D, E, and F, respectively. Talc A is 95-27 Talc TM, a Montana talc sold by Pfizer, Inc., New York, N.Y. Talc B is FCOR Talc TM, an Ontario talc sold by Luzenac, Inc., Oakville, Ontario, Canada. Talc C is Haichin, a China talc sold by Mainland China. Talc D is Broughton TM, a Quebec talc sold by Luzenac, Inc., Oakville, Ontario, Canada. Talc E is RM-1188-8/27-1A, a low surface area Montana talc acquired from ABB Raymond, Lisle, Ill. Talc F is BX-291, a low surface area Montana talc acquired from Pfizer, Inc., New York, N.Y.. Each talc exhibited different physical characteristics, including surface area, mean particle size, morphology index, and CaO content. The physical characteristics of the various talcs used in Samples 1–10 are shown in Table I below.

TABLE I

| Talc → | A | B | C | D | E | F |
|---|---|---|---|---|---|---|
| Talc Characteristic | | | | | | |
| Surface Area (m²/g) | 7.20 | 1.80 | 2.31 | 2.04 | 4.07 | 5.19 |
| Mean Particle Size (μm) | 6.80 | 9.20 | 9.20 | 7.40 | 14.8 | 10.0 |
| Morphology | 0.75 | 0.86 | 0.85 | 0.96 | 0.57 | 0.53 |
| CaO | 0.16 | 0.18 | 0.29 | 0.06 | 0.15 | 0.14 |

The uncalcined clay used to prepare the samples was either KAOPAQUE-10 TM (a delaminated kaolinite denominated as Clay H) or HYDRITE MP TM (a non-delaminated kaolinite denominated as Clay I). The calcined clay used in the samples was GLOMAX TM, denominated as Clay G. All of the above-mentioned clays are sold by Dry Branch Kaolin, Dry Branch, Ga. The physical characteristics of the various clays used are shown in Table II below.

TABLE II

| Clay → | G | H | I |
|---|---|---|---|
| Clay Characteristic | | | |
| Surface Area (m²/g) | 7.00 | 14.0 | 6.00 |
| Mean Particle Size (μm) | 1.50 | 1.50 | 8.00 |

The alumina-yielding ingredient used was either C701 TM (a coarse alumina having an average particle size of about 6 μm, sold by Alcan, New York, N.Y.), A-16SG TM (a fine alumina having an average particle size of about 0.6 μm sold by Aluminum Company of America, Pittsburgh, Pa.), or AC-714K TM (a hydrated alumina having an average particle size of about 3 μm, sold by Aluchem, Inc., Reading, Ohio).

Silicon dioxide was added to certain samples in the form of Sil-Co-Sil 75 TM (average particle size of about 18 μm, sold by U.S. Silica) or ISMIL TM (average particle size of about 4 μm, sold by Unimin Corporation, 258 Elm St., New Canaan, Conn.).

The relative proportions of the materials used to form the samples are illustrated in Table III below.

TABLE III

| Sample → | C1 | 2 | 3 | 4 | 5 | C6 | 7 | C8 | 9 | 10 |
|---|---|---|---|---|---|---|---|---|---|---|
| Component (weight %) | | | | | | | | | | |
| A- 95-27 Talc (Montana) | 40.47 | | | | | | | | | |
| B- FCOR Talc (Ontario) | | 40.75 | | | | 40.75 | 40.20 | | 40.70 | 40.75 |
| C- China Talc | | | | 40.75 | | | | | | |
| D- Quebec Talc | | | | | 40.75 | | | | | |
| E- Low S.A. #1 (Montana) | | | 40.75 | | | | | | | |
| F- Low S.A. #2 (Montana) | | | | | | | | 40.75 | | |
| G- Calcined Clay | 26.48 | 30.77 | 30.77 | 30.77 | 30.77 | 30.77 | 30.36 | 30.77 | | 30.77 |
| H- Kaopaque-10 | | 14.80 | 14.80 | 14.80 | 14.80 | | 14.60 | 14.80 | 16.00 | 14.80 |
| I- Hydrite MP | 15.37 | | | | | 14.80 | | | | |
| C701 Alumina | 15.35 | 13.68 | 13.69 | 13.68 | 13.68 | 13.68 | 10.89 | 13.68 | | 13.68 |
| A-16SG Alumina | | | | | | | | | 14.80 | |
| AC714K Hydrated Alumina | | | | | | | 3.95 | | 16.00 | |
| Sil-Co-Sil 75 (SiO₂) | | | | | | | | | 3.10 | |
| Ismil (SiO₂) | 2.03 | | | | | | | | 9.40 | |

The combinations of talc, calcined clay, uncalcined clay, alumina, hydrated alumina (aluminum hydroxide), and silica shown in Table I were blended together with about 2.7 wt % methylcellulose and about 0.6 wt % sodium stearate. Subsequently, about 20–32 wt % deionized water was added to each of the ten powder mixtures in a muller. After kneading, the combined ingredients were transferred to a vacuum extruder. The batches were extruded as 2.54 cm diameter round honeycomb structures with about 31 cells per square centimeter and a wall thickness of approximately 0.3 mm. Extruded ware was cut into approximately 16 cm long samples and dried in a dielectric dryer. The dried ware were then fired in kilns. Samples 1–9 were fired according to the following firing schedule:

25–200° C. in 2.0 hours;
200–325° C. in 5.0 hours;
325–450° C. in 2.5 hours;
450–600° C. in 6.5 hours;
600–900° C. in 3.0 hours;

-continued

```
 900–1100° C. in 4.0 hours;
1100–1130° C. in 2.0 hours;
1130–1160° C. in 2.0 hours;
1160–1265° C. in 4.0 hours;
1265–1320° C. in 3.0 hours;
1320–1390° C. in 6.0 hours;
Hold @ 1390° C. for 8.0 hours;
1390–650° C. in 8.0 hours;
 650–100° C. in 5.0 hours.
```

Sample 10 was fired according to the following firing schedule:

```
  25–200° C. in 160 mins.;
 200–450° C. in 8.0 hours;
 450–600° C. in 6.0 hours;
 600–900° C. in 3.0 hours;
 900–1040° C. in 150 mins.;
1040–1160° C. in 8.0 hours;
1160–1260° C. in 100 mins.;
1260–1350° C. in 110 mins.;
1350–1370° C. in 35 mins.;
1370–1405° C. in 105 mins.;
Hold @ 1405° C. for 12.0 hours;
1405–650° C. in 8.0 hours;
 650–25° C. in 5.0 hours.
```

The fired samples were evaluated for coefficient of thermal expansion (CTE), coefficient of thermal contraction (CTC), transverse I ratio ($I_t$), modulus of rupture (MOR), and water absorption. The coefficient of thermal expansion was measured between 25° and 800° C. using a standard thermal expansion dilatometer. The coefficient of thermal contraction was measured between 600° and 400° C. using the same method described above for measurement of coefficient of thermal expansion CTE. The transverse I ratio was determined by standard X-ray techniques. Modulus of rupture was measured by a standard 4-point bend technique. Water absorption was measured using a boiling water technique in which an Archimedes-style weight measurement was made to quantify the water pick-up of the ceramic body after boiling the part in water for at least thirty minutes. The experimental results of these analyses are shown below in Table IV.

ventionally "platy" geometry does not guarantee optimum physical properties. Samples C1 and C8 utilized Talcs A and F, respectively, which have surface areas outside the scope of that described as useful in the method of the present invention. Talcs A and F, although platy, exhibited surface areas of 7.20 $m^2/g$ (Talc A) and 5.19 $m^2/g$ (Talc F) and morphology indices of 0.75 (Talc A) and 0.53 (Talc F). Accordingly, Samples C1 and C8 both exhibited comparatively high coefficients of thermal expansion (i.e., $7.1 \times 10^{-7}/°C$. for Sample C1 and $4.6 \times 10^{-7}/°C$. for Sample C8).

Likewise, analysis of Sample C6 demonstrates the importance of using both a talc with a surface area no greater than 4.0 $m^2/g$ and clay having an average particle size of no greater than about 2.0 μm. Sample C6 was prepared with Talc B which exhibited a low surface area of 1.8 $m^2/g$. However, Sample C6 also contained HYDRITE MP ™, a coarse clay having a mean particle size of 8.0 μm. Sample C6 exhibited a comparatively high coefficient of thermal expansion of $5.9 \times 10^{-7}/°C$.

Sample 4 indicates the preferability of using a talc with a low CaO content, in accordance with the present method. Sample 4 was prepared with Talc C which exhibits a surface area of 2.31 $m^2/g$. However, Talc C also has CaO content of 0.29 wt %. Sample 4 exhibited a higher coefficient of thermal expansion (i.e., $5.4 \times 10^{-7}/°C$.) than other low surface area talcs that had lower concentrations of CaO.

As indicated by Table IV, cordierite-containing bodies produced by the present method exhibit low coefficients of thermal contraction between 600° and 400° C. The coefficient of thermal contraction between 600°–400° C. is critical because that is the temperature range within a thermal shock cycle when microcracks are believed to become operable and is a good indication of how operative the microcracks will be in limiting failure of the cordierite body. Microcracking is discussed in U.S. Pat. No. 3,979,216 to Fritsch, Jr., et al. The coefficient of thermal contraction values for Samples 2, 5, 9, and 10, for example, are all below $7.0 \times 10^{-7}/°C$. and are indicative of good predicted thermal shock resistance.

Although the invention has been described in detail for the purpose of illustration, it is understood that such

TABLE IV

| Sample → | C1 | 2 | 3 | 4 | 5 | C6 | 7 | C8 | 9 | 10 |
|---|---|---|---|---|---|---|---|---|---|---|
| Property | | | | | | | | | | |
| CTE ($\times 10^{-7}/°C$.) (25–800° C.) | 7.1 | 3.2 | 4.2 | 5.4 | 2.8 | 5.9 | 3.8 | 4.6 | 2.9 | 2.0 |
| CTC ($\times 10^{-7}/°C$.) (600–400° C.) | 10.0 | 5.6 | 7.2 | 9.5 | 6.4 | 9.2 | 8.5 | 8.9 | 6.4 | 4.8 |
| $I_t$ ratio | 0.81 | 0.88 | 0.86 | 0.84 | 0.91 | 0.89 | 0.90 | 0.85 | 0.89 | 0.82 |
| MOR (psi) | 2690 | 2275 | 2600 | 3080 | 2410 | 2150 | 2150 | 2880 | 2410 | — |
| Water Absorption (%) | 24.4 | 20.5 | 19.1 | 21.3 | 20.5 | 25.0 | 21.3 | 18.8 | 18.7 | — |

As shown by Table IV, Samples 2, 5, 7, 9, and 10 (each containing talc with a surface area of no greater than about 4.0 $m^2/g$ and clay having an average particle size of no greater than about 2.0 μm) all exhibited coefficients of thermal expansion of $3.8 \times 10^{-7}/°C$. or less. Sample 4 also used a talc with a surface area of no greater than about 4.0 $m^2/g$ and clay having an average particle size of no greater than about 2.0 μm, but exhibited a relatively high coefficient of thermal expansion ($7.2 \times 10^{-7}/°C$.) due to the high calcium content in the talc used (0.29 wt %).

A comparison of comparative Samples C1 and C8 clearly indicate that merely using a talc having a condetail is solely for that purpose, and variations can be made therein by those skilled in the art without departing from the spirit and scope of the invention which is defined by the following claims.

What is claimed is:

1. A method of making a cordierite body exhibiting a low coefficient of thermal expansion, comprising the steps of:

providing raw materials, including alumina-yielding ingredients, magnesia-yielding ingredients, and silica-yielding ingredients, suitable to form an analytical batch composition by weight on an oxide basis of 9–20 weight percent MgO, 30–50 weight percent $Al_2O_3$, and 41–56.5 weight percent $SiO_2$, wherein said raw materials do not include silica as a source of silicon, comprise talc having a BET surface area of no greater than about 4.0 $m^2/g$, and comprise clay having an average particle size of no greater than about 2.0 μm;

blending said raw materials with an effective amount of vehicle and forming aids to form a plastic mixture;

anisostatically forming the plastic mixture into a green body;

drying the green body; and firing the dried green body at a temperature and for a time effective to form a cordierite-containing ceramic article having a coefficient of thermal expansion no greater than about $4.0 \times 10^{-7}/°C.$ from about 25° to 800° C.

2. A method according to claim 1, wherein said cordierite-containing ceramic article has coefficient of thermal contraction no greater than about $7.0 \times 10^{-7}/°C.$ from about 600° to 400° C.

3. A method according to claim 2, wherein said raw materials further comprise alumina having an average particle size greater than about 2 μm.

4. A method according to claim 1, wherein said raw materials further comprise alumina having an average particle size no greater than about 2 μm.

5. A method according to claim 1, wherein said cordierite-containing ceramic article has coefficient of thermal expansion no greater than about $3.0 \times 10^{-7}/°C.$ from about 25° to 800° C.

6. A method according to claim 1, wherein said BET surface area of said talc is no greater than about 2.0 $m^2/g$.

7. A method according to claim 1, wherein said talc contains no more than about 0.19 weight percent CaO.

8. A method according to claim 1, wherein said raw materials comprise about 10 to about 20 weight percent alumina, about 28 to 32 weight percent calcined clay, about 10 to about 20 weight percent uncalcined clay, and talc.

9. A method according to claim 1, wherein said cordierite-containing article has an overall porosity of less than about 40 percent.

10. A method according to claim 1, wherein said cordierite-containing article has a transverse I ratio of at least about 0.85.

11. A method according to claim 6, wherein said cordierite-containing article has a transverse I ratio of at least about 0.88.

12. A method according to claim 1, wherein said cordierite-containing article has a modulus of rupture greater than about 2000 psi.

13. A method of making a cordierite body exhibiting a low coefficient of thermal expansion, comprising the steps of:

providing raw materials, including alumina-yielding ingredients, magnesia-yielding ingredients, and silica-yielding ingredients, suitable to form an analytical batch composition by weight on an oxide basis of 9–20 weight percent MgO, 30–50 weight percent $Al_2O_3$, and 41–56.5 weight percent $SiO_2$, said raw materials consisting essentially of about 39 to 42 weight percent talc having a BET surface area value of no greater than about 4.0 $m^2/g$, about 10 to 20 weight percent uncalcined, delaminated clay having an average particle size of no greater than about 2.0 μm, about 28 to 32 weight percent calcined clay, and about 10 to 20 weight percent alumina having an average particle size no less than 2.0 μm;

blending said raw materials with an effective amount of vehicle and forming aids to form a-plastic mixture;

anisostatically forming the plastic mixture into a green body;

drying the green body; and firing the dried green body at a temperature and for a time effective to form a cordierite-containing ceramic article, wherein said cordierite-containing article has a coefficient of thermal expansion no greater than about $4.0 \times 10^{-7}/°C.$ from about 25° to 800° C.

* * * * *